(12) United States Patent
Delgado Campos et al.

(10) Patent No.: US 10,051,595 B2
(45) Date of Patent: Aug. 14, 2018

(54) SITE MODEL SELECTION FOR A WIRELESS ACCESS POINT

(75) Inventors: Allan Delgado Campos, San Jose (CR); Fabiel Zuniga Gallegos, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/413,417

(22) PCT Filed: Jul. 9, 2012

(86) PCT No.: PCT/US2012/045935
§ 371 (c)(1),
(2), (4) Date: Jan. 7, 2015

(87) PCT Pub. No.: WO2014/011145
PCT Pub. Date: Jan. 16, 2014

(65) Prior Publication Data
US 2016/0050640 A1 Feb. 18, 2016

(51) Int. Cl.
*H04W 64/00* (2009.01)
*H04W 24/02* (2009.01)
*H04W 88/08* (2009.01)
*H04W 16/18* (2009.01)

(52) U.S. Cl.
CPC ......... *H04W 64/003* (2013.01); *H04W 24/02* (2013.01); *H04W 16/18* (2013.01); *H04W 88/08* (2013.01)

(58) Field of Classification Search
None
See application file for complete search history.

(56) References Cited

U.S. PATENT DOCUMENTS

| 7,474,897 | B2 | 1/2009 | Morgan et al. |
| 7,756,523 | B2 | 7/2010 | Ebata |
| 8,068,441 | B1 | 11/2011 | Wiedmann et al. |
| 2005/0048987 | A1 | 3/2005 | Glass |
| 2005/0090263 | A1* | 4/2005 | Ebata ............... H04W 16/08 455/453 |

(Continued)

FOREIGN PATENT DOCUMENTS

| CN | 101208965 | 6/2008 |
| EP | 2056532 A1 | 5/2009 |

(Continued)

OTHER PUBLICATIONS

PCT/ISA/KR, International Search Report dated May 30, 2013, PCT/US2012/045935, 10 pps.

(Continued)

*Primary Examiner* — Anez Ebrahim
(74) *Attorney, Agent, or Firm* — Hewlett Packard Enterprise Patent Department

(57) ABSTRACT

Techniques are provided for placing wireless access points on a site model. An indication of a newly detected wireless access point is received. Perceived signal strengths are received from the newly detected wireless access point or located wireless access points. A site model is selected based on the received perceived signal strengths. The newly detected wireless access point is placed on the selected site model.

20 Claims, 8 Drawing Sheets

(56) References Cited

U.S. PATENT DOCUMENTS

| | | | |
|---|---|---|---|
| 2005/0243936 A1* | 11/2005 | Agrawala | H04W 64/00 375/259 |
| 2005/0255890 A1 | 11/2005 | Nakada | |
| 2006/0240840 A1* | 10/2006 | Morgan | G01S 5/02 455/456.1 |
| 2007/0025287 A1 | 2/2007 | Goren et al. | |
| 2007/0082677 A1 | 4/2007 | Hart et al. | |
| 2008/0259885 A1 | 10/2008 | Faulkner et al. | |
| 2010/0026513 A1 | 2/2010 | Pandey | |
| 2010/0049857 A1 | 2/2010 | Libert | |
| 2010/0079599 A1 | 4/2010 | Kanma | |
| 2010/0210280 A1 | 8/2010 | Haynes et al. | |
| 2012/0056785 A1* | 3/2012 | Jovicic | G01S 5/0236 342/450 |

FOREIGN PATENT DOCUMENTS

| | | |
|---|---|---|
| WO | WO-2010/100325 A1 | 9/2010 |
| WO | WO-2012052700 | 4/2012 |

OTHER PUBLICATIONS

Ashish Raniwala; Deployment Issues in Enterprise Wireless LANs; Stony Brook University; Sep. 1, 2002, 33pps, http://www.ecsl.cs.sunysb.edu/tr/wlandeployment.pdf >.

Webpage—Askubuntu; Automatically Add New Wireless Access Points; Aug. 2010; http://askubuntu.com/questions/3055/automatically-add-new-wireless-access-points.

Extended European Search Report, EP Application No. 12880952.2, dated Mar. 2, 2016, pp. 1-12.

* cited by examiner

SITE MODEL SELECTION FOR A WIRELESS ACCESS POINT

BACKGROUND

Modern computer networks contain many different elements. In addition to server and client computers, there are many different devices, such as routers, switches, wireless access points, firewalls, security appliances, storage appliances, and many other types of devices. All of these devices may require administration and maintenance. Typically, each of these devices may provide a user interface that allows for any necessary configuration of the device.

However, as networks increase in size and in geographic span, it becomes increasingly difficult to manage each device using its own configuration interface. For example, a corporate network may contain devices that span the globe. It becomes increasingly difficult to manage the devices individually because keeping track of how to access the configuration interface of each device becomes more complicated as the number of devices increase.

To alleviate this problem, network management software has been created. The network management software may run on a computer and is configured to access each of the devices on the network. In addition, the network management software may keep track of where a device is physically located. For small networks, such information is not vital, however, for large, geographically diverse networks, simply discovering where on the globe a particular device is can be a difficult task, absent network management software.

DETAILED DESCRIPTION

As was mentioned above, modern computer networks may be extremely complex, with many different devices and spanning many different geographic regions. Network management software may be used as a central location for network management activities, such as noting the physical location of devices and configuring those devices. However, a problem may arise when a new device is added to the network. If the network management software is not updated to reflect the presence of the new device, the ability to locate and manage the device is somewhat limited.

For some devices, there is nothing that can be done to aid in locating the device absent manual user intervention to specify the location of the device. However, other classes of devices may have capabilities that would aid the network management software in locating where the device is physically installed. One such class of device is a wireless access point (WAP). A WAP is a device that allows client computers and servers to connect to the network wirelessly, via radio frequency (RF) communications. In addition to enabling client and server connectivity, a WAP has the ability to receive RF communications from other WAPs and report the perceived RF signal strength to the network management software.

The techniques described herein make use of the ability of a WAP to receive and measure the strength of RF communications to aid in locating a newly detected WAP and place the newly detected WAP in the proper physical location within the network management software's view of the network. In one example embodiment, one or more WAPs that already exist within the knowledge of the network management software report the received signal strength of the newly detected WAP. Based on this information, the network management software may be able to determine the physical location of the newly installed WAP.

In another example embodiment, the newly detected WAP may report the signal strengths received from one or more previously existing WAPs. Based on this information, the network management software may be able to determine the physical location of the newly detected WAP. In some embodiments, the network management software is able to locate the newly detected WAP to a coarse degree, such as a city, a building, or a floor of a building. In some embodiments, a finer level of location, such as a specific location, on a specific floor, of a specific building may be achieved.

Figure 1:
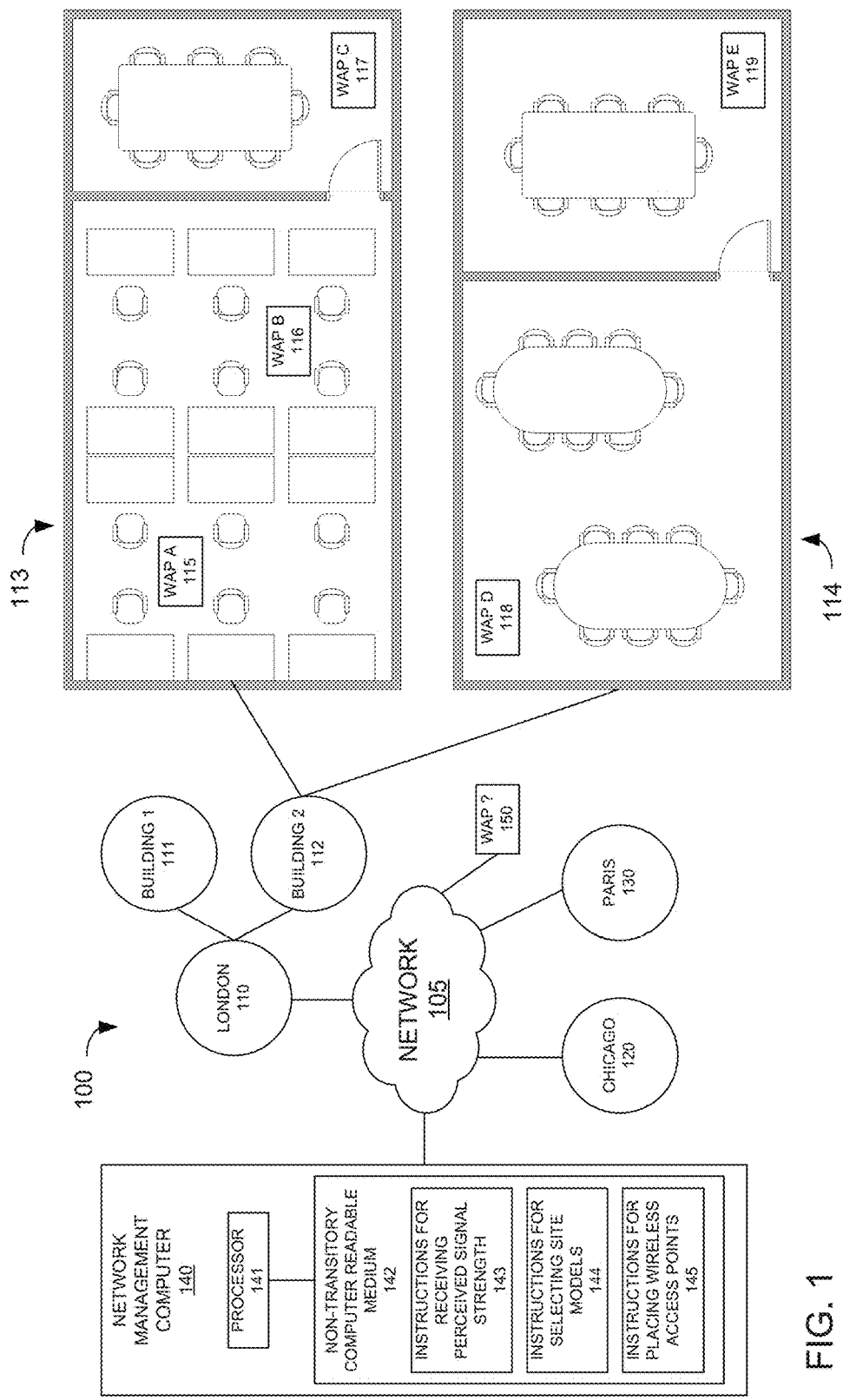
FIG. 1 is an example of a high level network diagram.

FIG. 1 is an example of a high level network diagram. The example system 100 shown in FIG. 1 may manage network devices that span the globe. For example, as shown in FIG. 1, the network 105 may include sites in several cities, such as London 110, Chicago 120, and Paris 130. Each of these cities may contain several locations. As shown in the example, in London 110, there may be two different buildings, such as building one 111 and building two 112. Furthermore, within a single building, there may be multiple floors. As shown in the example network diagram, building two 112 in London 110 may contain multiple floors. Each of these floors may be associated with a site model. For example, the first floor may be associated with site model 113, while the second floor is associated with site model 114. Site models will be described in further detail below. It should be understood that the system described herein is merely an example of a possible network. The techniques described herein are not limited to any particular geographic distribution.

A site model may be the network management software's view of the devices located at a particular site. For example, site model 113 may be a depiction of the first floor of building two in London. The site model may contain the physical locations of the various devices as well as the physical layout of the site. As shown in site model 113, the first floor may comprise several rooms, with desks and tables situated therein. The site model may also contain the physical locations of the devices connected to the network. For purposes of ease of description, only the WAPs are shown. As shown, there are three WAPs (A 115, B 116, and C 117) on site model 113. The location of these WAPs on the site model represents the physical location of the device in the real world. Similarly, site model 114 represents the second floor of building two. Site model 114 contains two WAPs (D 118 and E 119).

In some embodiments, a system administrator may manually place a newly detected WAP on the site model in the proper location. In other embodiments, the system will automatically place the WAP, which will be described in further detail below. For purposes of this description, a WAP that has already been placed on a site model is referred to as a located WAP. This means that the WAP has already been placed in the proper location on the site model within the network management software, such that the software knows the physical location of the device. A WAP that has not yet been placed on a site model is referred to as a newly detected WAP. The process of transforming a newly detected WAP to a located WAP is described in further detail below.

System 100 may also include a network management computer 140. The network management computer may be used to run network management software that is in turn used to manage the devices connected to network 105. Although the network management computer is shown as a standalone computer, it should be understood that the network management software may be run on any computer connected to the network and is not limited to a single computer. The network management computer may be used to provide many types of configuration and management functions for devices stored on the network. For purposes of this disclosure, only the placement of WAPs on site model will be described, however it should be understood that the capabilities of the network management software may extend much further than WAP placement.

The network management computer 140 may comprise a processor 141. The processor may be coupled to a non-transitory computer readable medium 142 that stores instructions thereon. If the instructions stored on the non-transitory computer readable medium are executed by the processor, the functionality described herein may be implemented. For example, the non-transitory computer readable medium may contain instructions for receiving perceived signal strengths 143 from wireless access points, instructions for selecting site models 144, and instructions for placing wireless access points 145. The functionality provided by these instructions is described in further detail below and in conjunction with FIGS. 3-8.

In operation, a new WAP 150 may be installed. Because the network management software initially has no knowledge of where the newly installed WAP has been installed, the WAP is a newly detected WAP. Using conventional WAP configuration parameters, the network management software may configure the newly detected WAP. The newly detected WAP may then provide wireless connectivity to devices within the range of the newly detected WAP.

In one example embodiment, the newly detected WAP may "see" the wireless signals that are being emitted by WAPs that have already been located. For purposes of this description "seeing" a wireless signal from a WAP means that the wireless radio frequency signal is received by the WAP and the perceived signal strength of the received wireless signal can be measured. The newly detected WAP may report the signals that it can see from already located WAPs. As would be known by a person of skill in the art, a typical WAP may have a range of several hundred feet. A typical WAPs range does not extend to covering wide geographic areas.

The network management computer may receive the reports from the newly detected WAP to determine on which site model the newly detected WAP should be placed. For example, if newly detected WAP 150 is able to see some or all of the located WAPs 115-119, then it is most likely the case that the newly detected WAP was installed somewhere in building two 112 in London 110.

To further aid in placement of the newly detected WAP onto a site model, the specific located WAPs that are seen by the newly detected WAP may be analyzed. For example, if the newly detected WAP is only able to see WAPs 115-117, the newly detected WAP may most likely be located on the first floor 113. Likewise, if only located WAPs 118-119 are seen, then the newly detected WAP is most likely located on the second floor 114. The appropriate site model may be chosen by the network management software and presented to the user. The user may then choose to accept the selection of the site model and the newly detected WAP may be generally associated with the selected site model. In some embodiments, the newly detected WAP is placed on the site model without a specific location. However, in other embodiments, the newly detected WAR may be placed in a specific location on the site model. The process of specifically locating the newly detected WAP is described in further detail with respect to FIG. 2.

In some cases, a newly detected WAP may be able to see located WAPs that are contained in different site models. For example, the newly detected WAP may have been installed on the first floor 113 in such a way that, due to the nature of RF communications, located WAPs from both the first and second floor are seen. For example, a newly detected WAP may be able to see WAPs 115, 116, and 118 (i.e. two on the first floor and one on the second). In such cases, the network management software may order the list of site models based on the number of WAPs that can be seen on each site model. In this example, because two WAPs located on the first floor are seen, but only one WAP on the second floor is seen, the first floor may be placed higher in order than the second floor. The site model with the highest number of located WAPs that are seen may then be chosen.

In some cases, the newly detected WAP may see the same number of located WAPs from different site models. For example, the newly detected WAP may see located WAPs 115 and 118 (i.e. one from the first floor and one from the second floor). In such a case, the perceived signal strengths of the signals from the located WAPs may be used to settle such a "tie". For example, in the case of two WAPs, each located on different site models, the WAP with the highest signal strength may be selected. If there are multiple WAPs with the same reported signal strength, the process may be iterated. For example, if there are two WAPs each from two different site models, the two WAPs with the highest signal strength from each model may be compared. If there happens to be a tie, the next two highest signal strengths may be compared. This process may be repeated for each pair of reported signal strengths, and the highest site model containing the highest signal strength may be selected.

The above description has been presented in terms of the newly located WAP seeing already located WAPs. In another exemplary embodiment, a similar process may occur, although rather than the newly detected WAP reporting which located WAPs are seen, the located WAPs report the newly detected WAP. For example, a newly located WAP may be placed on the first floor 113. The newly detected WAP may be seen by the located WAPs 115-119 and this fact may be reported to the network management software. Just as above, the network management software may determine the site model with the greatest number of located WAPs that report seeing the newly detected WAP.

Also, just as above, if there is a tie between the number of located WAPs that can see the newly detected WAP, the signal strengths of the newly detected WAP that is received by the located WAPs can be compared. Again, the site model containing highest signal strength may be selected. Also, just as above, if there are equal numbers of located WAPs on each site model that can see the newly detected WAP, then the highest signal strengths received can be compared. If there is a tie, the next highest set of signal strengths can be compared.

The description above was presented in terms of two site models that are detecting a newly located WAP. However, this was for purposes of ease of description and is not limiting. It should be understood that WAPs on any number of different site models may report other WAPs that are seen. For example, the building 112 described in FIG. 1 may have any number of floors. Any WAP on any site model that is able to see or be seen by a newly detected WAP may report this fact to the network management software. The software then may rank the site models based on the number of WAPs seen from each site model and the signal strengths, as described above.

Furthermore, it should be understood that both embodiments described above may be used simultaneously. For example, a first site model may be selected based on the located WAPs that can see the newly detected WAP. A second site model may be selected based on the located WAPs that can be seen by the newly detected WAP. The two site models may then be presented to the user to receive the final selection of a site model on which to place the newly detected WAP.

Figure 2:
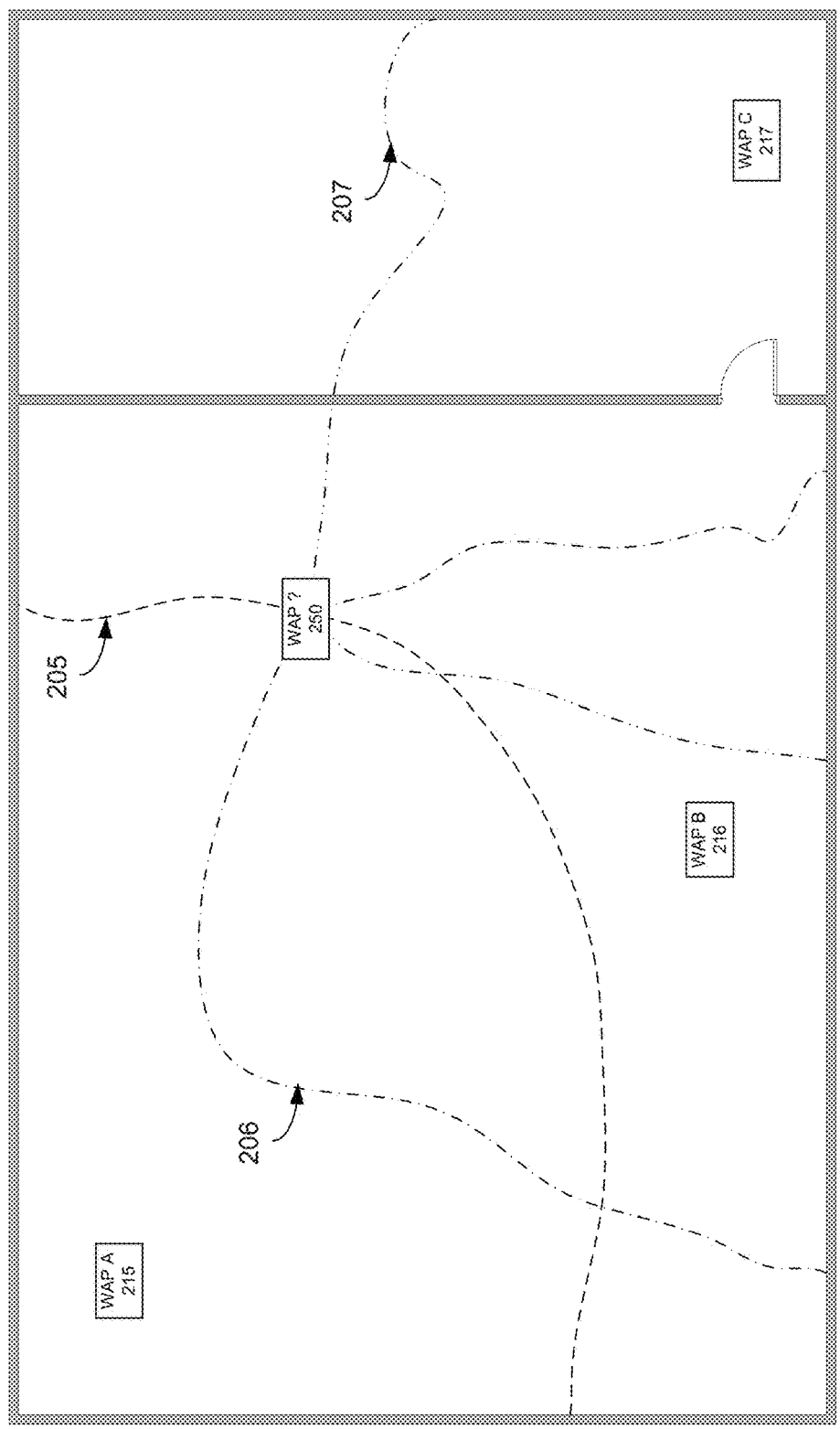
FIG. 2 is an example of physically locating a wireless access point.

FIG. 2 is an example of physically locating a wireless access point. FIG. 2 is a reproduction of the first floor 113 shown in FIG. 1, with only the structure of the floor shown for ease of depiction. In the description presented above with respect to FIG. 1, the network management software may determine a particular site model on which a newly detected WAP should be placed based on the located WAPs that can either see or be seen by the newly detected WAP. In many cases, selection of the proper site model is sufficient, without placing the newly detected WAP in the correct physical location on the site model. However, in some example embodiments, the network management software may go a step further and place the newly detected WAP in a physical location on the site model based on the signal strengths received.

The network management software may contain a RF propagation model for each site model. The RF propagation model may use known techniques to predict the propagation of RF signals within a site model, given any known obstructions or other properties of the site model. Some examples of such obstructions and properties can include walls, furniture, the types building materials used, or any other factors that may affect the transmission of RF signals. Based on these propagation models, the network management software may be able to determine the locations on a site model where a particular signal strength may be received.

For example, assume that newly detected WAP 250 is located somewhere within the site model depicted in FIG. 2. Also assume that located WAP 215 is able to see the newly detected WAP 250 and is able to report the received signal strength. Based on the propagation model, the network management software may determine the locations in the site model where the newly detected WAP may be given the signal strength being reported by WAP 215. As shown in FIG. 2, line 205 may represent the possible locations of the newly detected WAP based on the signal strength received by WAP 215. Likewise, line 206 represents the possible locations of the newly detected WAP based on the signal strength received by located WAP 216 and line 207 represents the possible locations of the newly detected WAP based on the signal strength received by located WAP 217.

By determining the point where lines 205-207 intersect, the network management software is able to determine where on the site model the newly located WAP is physically located. As should be clear, the greater the number of located WAPs reporting signal strength, the more accurate the placement may be.

Placement of the newly located WAP may also be based on the signal strength received by the newly detected WAP from the located WAPs. Although not shown, the process is very similar. The newly detected WAP may report the signal strength received from one or more of the located WAPs. By using the propagation model, the network management software may determine where on the site model the newly detected WAP is located by determining the locations on the site model where it is expected that the signal strength received by the newly detected WAP matches the signal strength being reported. Again, just as in the case where the located WAPs report the received signal strengths, the greater the number of located WAPs seen by the newly detected WAP, the greater the accuracy in placing the newly detected WAP.

Figure 3:
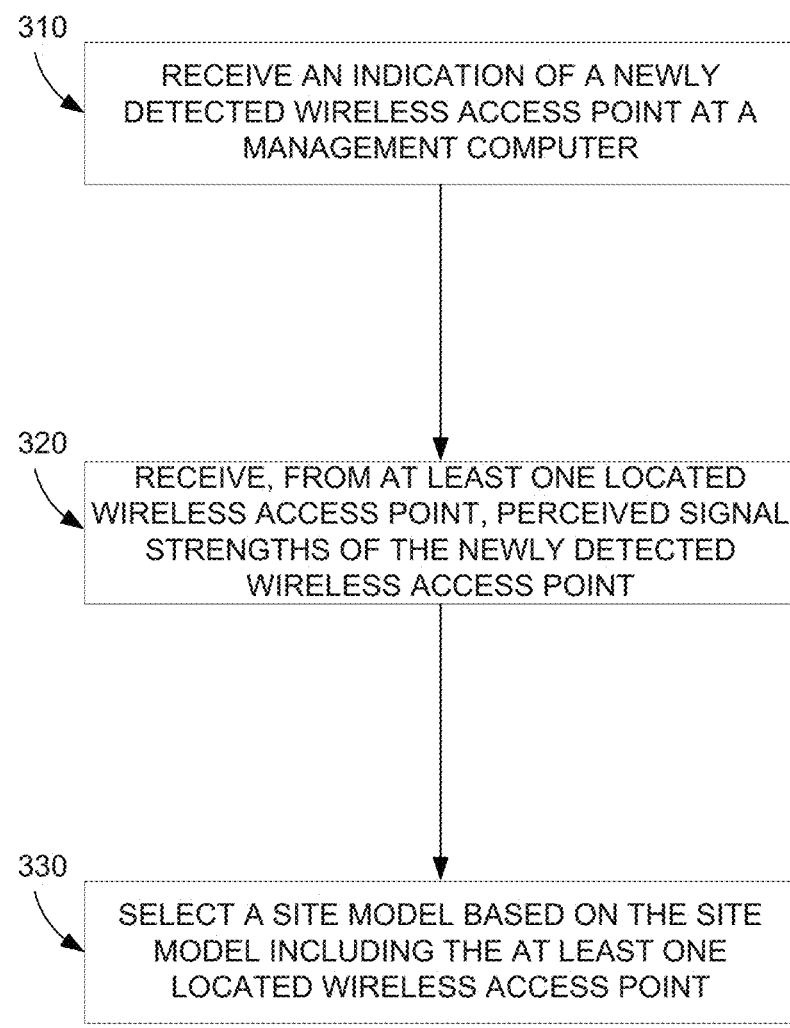
FIG. 3 is an example of a high level flow diagram for selecting a site model.

By selecting the site model first, a more accurate placement of the newly detected WAP may be achieved. Although it would be possible to triangulate the position of the newly detected WAP based on received signal strengths of all WAPs (including those not on the same site model) such location would be less accurate. For example, if WAPs on both the first and second floor were used to located the newly detected WAP, such location may result in the WAP being placed in the middle of two floors based on the signal strengths, which is not physically possible. By restricting the WAPs used in the location process to those that are contained in the same site model, a better placement of the newly detected WAP may be achieved, FIG. 3 is an example of a high level flow diagram for selecting a site model. In block 310 an indication of a newly detected wireless access point may be received at a management computer. For example, this may occur when the newly detected WAP is connected to the network and reports its presence to the network management software. At block 320, the perceived signal strength of the newly detected WAP may be received from at least one located WAP. As explained above, each located WAP may report the signal strength of the newly detected WAP to the network management computer.

At block 330, a site model may be selected based on the site model that includes the at least one located WAP. As previously explained, the located WAPs may report the signal strengths of the newly detected WAP The network management software may select a site model that includes at least one of the located WAPs that is reporting a signal strength of the newly detected WAP.

Figure 4:
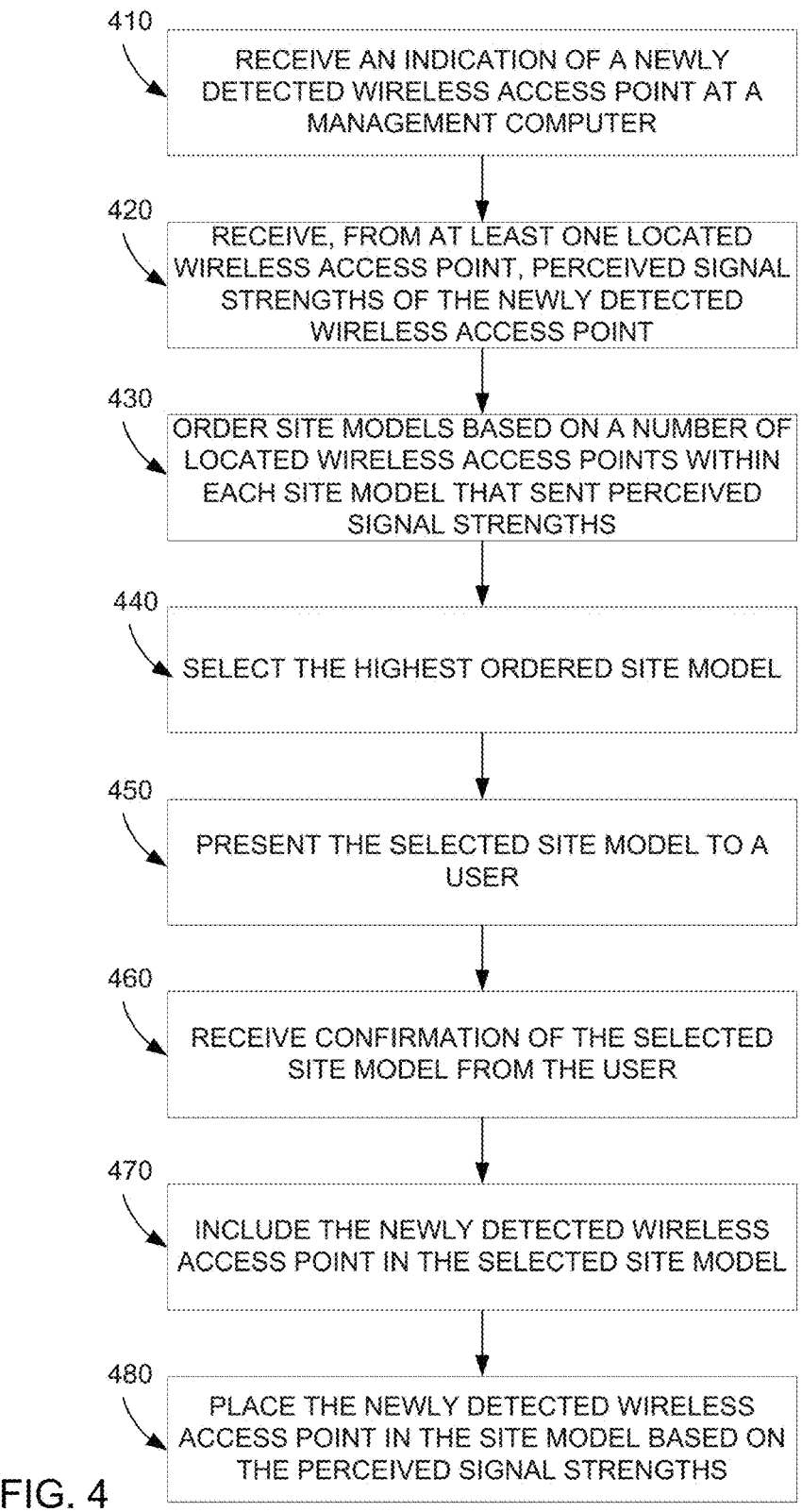
FIG. 4 is an example of a high level flow diagram for placing a wireless access point.

FIG. 4 is an example of a high level flow diagram for placing a wireless access point. In block 410 an indication of a newly detected wireless access point may be received at a management computer. As above, this may occur when the newly detected WAP reports its presence on the network. At block 420, the perceived signal strength of the newly detected WAP may be received from at least one located WAP. Again, as above, a located WAP may report the received signal strength to the network management computer.

In block 430, the site models may be ordered based on a number of located WAPs within each site model that sent perceived signal strengths. For example, the site models may be ordered based on the number of located WAPs within each site model that report seeing the newly detected WAP. Ordering may also include ordering based on the perceived signal strength received. In block 440, the highest ordered site model may be selected by the network management software. In some embodiments, this selection is automatically used by the network management software. In other embodiments the user is given an opportunity to confirm the selection made. In block 450, the selected site model is presented to the user. In block 460, confirmation of the selected site model is received from the user.

In block 470, the newly detected WAP is included in the selected site model. In some embodiments, the newly detected WAP is included in the selected site model, but is not automatically placed at a physical location within the site model. In other embodiments, the newly detected WAP is automatically placed. In block 480, the newly detected WAP is placed in the site model at the determined location based on the perceived signal strengths.

Figure 5:
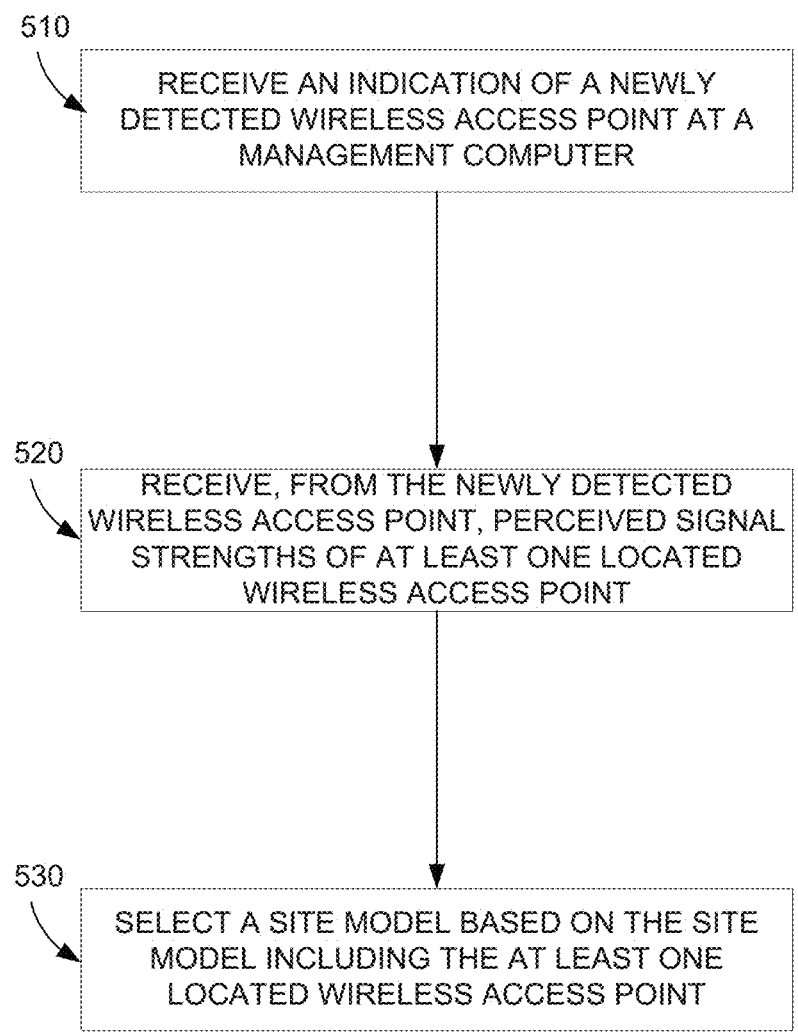
FIG. 5 is an example of a high level flow diagram for selecting a site model.

FIG. 5 is an example of a high level flow diagram for selecting a site model. In block 510 an indication of a newly detected wireless access point may be received at a management computer. For example, this may occur when the newly detected WAR is connected to the network and reports its presence to the network management software. At block 520, the perceived signal strength of at least one located WAP may be received from the newly detected WAP. As explained above, the newly detected WAP may report the signal strength of the located WAPs that it can see to the network management computer.

Al block 530, a site model may be selected based on the site model that includes the at least one located WAP. As previously explained, the newly detected WAP may report the signal strengths of the located WAPs that it can see. The network management software may select a site model that includes at least one of the located WAPs for which the newly detected WAP is reporting a signal strength.

Figure 6:
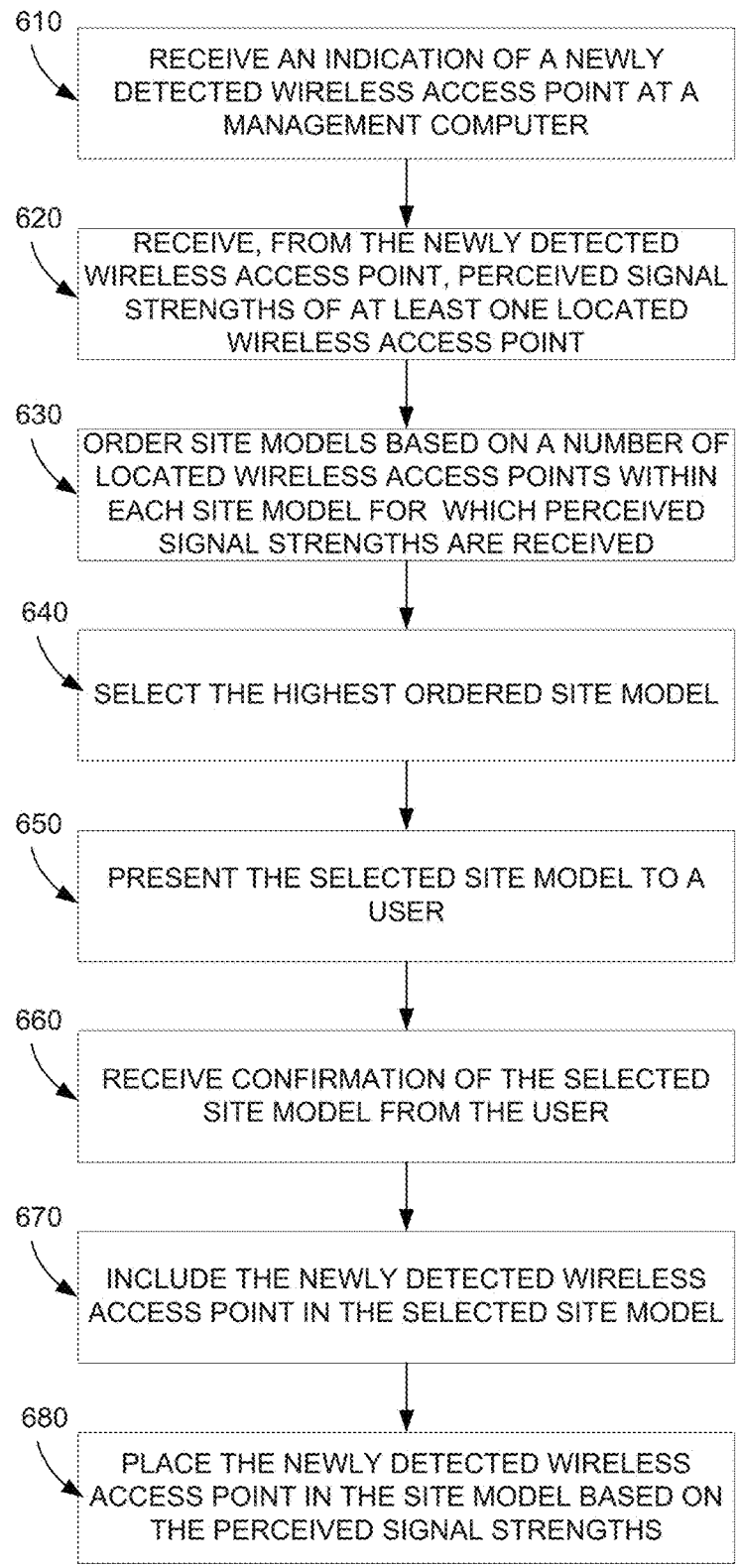
FIG. 6 is an example of a high level flow diagram for placing a wireless access point.

FIG. 6 is an example of a high level flow diagram for placing a wireless access point. In block 610 an indication of a newly detected wireless access point may be received at a management computer. As above, this may occur when the newly detected WAP reports its presence on the network. At block 620, the perceived signal strength of at least one located WAP may be received from the newly detected WAP. Again, as above, a newly detected WAP may report the received signal strengths of located WAPs that can be seen to the network management computer.

In block 630, the site models may be ordered based on a number of located WAPs within each site model for which perceived signal strengths were received. For example, the site models may be ordered based on the number of located WAPs within each site model that were reported as being seen by the newly detected WAP. Ordering may also include ordering based on the perceived signal strength received. In block 640, the highest ordered site model may be selected by the network management software. In some embodiments, this selection is automatically used by the network management software. In other embodiments the user is given an opportunity to confirm the selection made. In block 650, the selected site model is presented to the user. In block 660, confirmation of the selected site model is received from the user.

In block 670, the newly detected WAP is included in the selected site model. In some embodiments, the newly detected WAP is included in the selected site model, but is not automatically placed at a physical location within the site model. In other embodiments, the newly detected WAP is automatically placed. In block 680, the newly detected WAP is placed in the site model at the determined location based on the perceived signal strengths.

Figure 7:
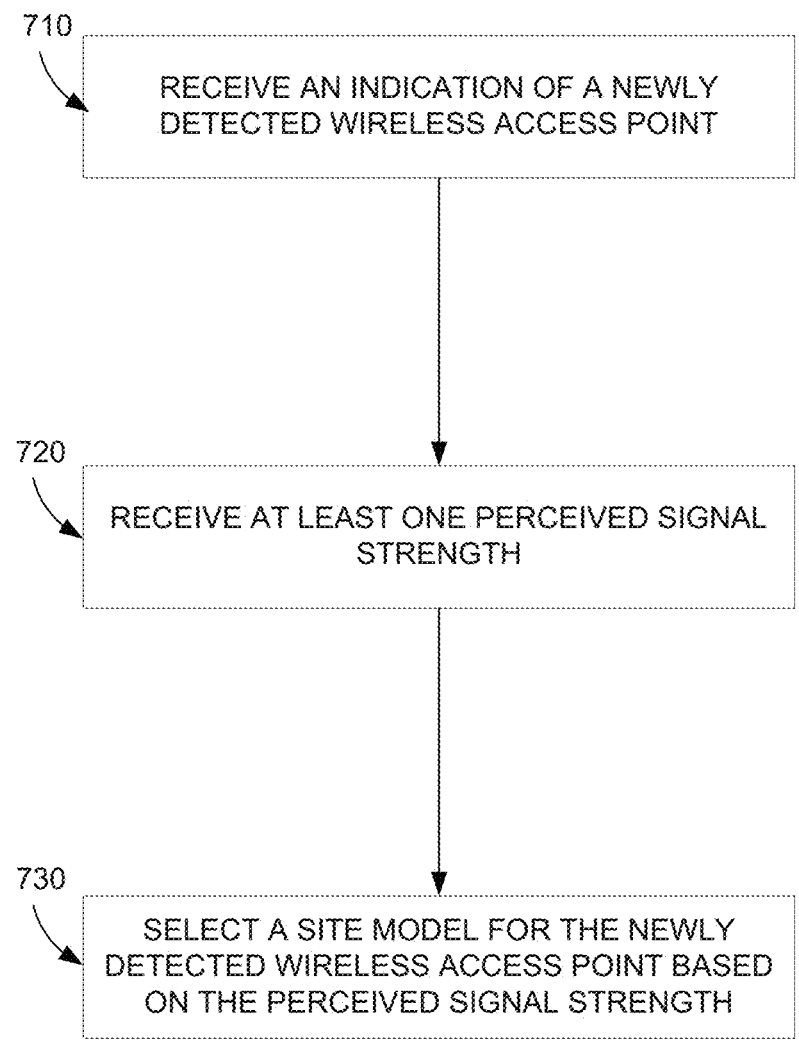
FIG. 7 is an example of a high level flow diagram for selecting a site model.

FIG. 7 is an example of a high level flow diagram for selecting a site model. In block 710 an indication of a newly detected wireless access point is received. In block 720, at least on perceived signal strength is received. In block 730 a site model is selected for the newly detected wireless access point based on the perceived signal strength.

Figure 8:
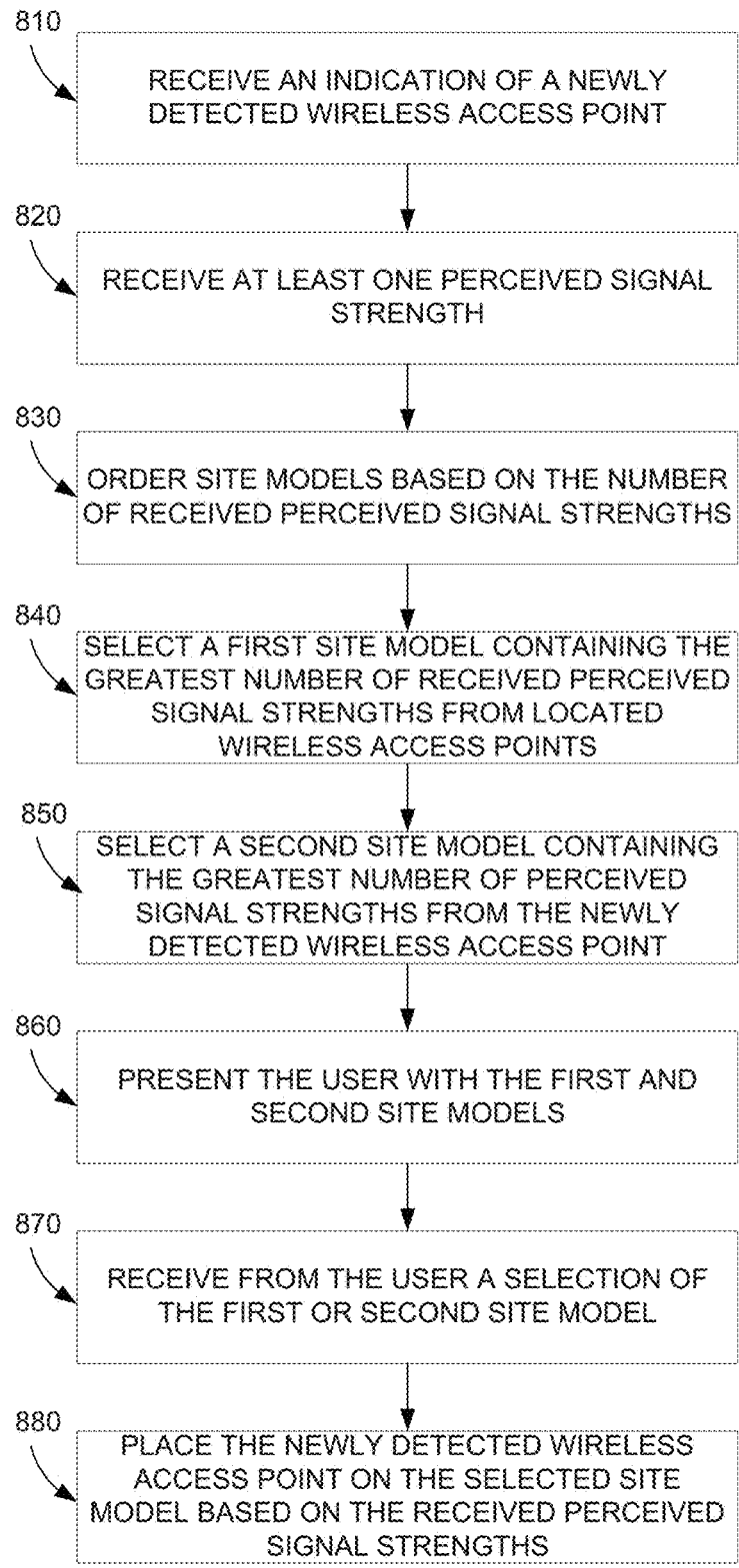
FIG. 8 is an example of a high level flow diagram for placing a wireless access point.

FIG. 8 is an example of a high level flow diagram for placing a wireless access point. In block 810 an indication of a newly detected wireless access point is received. In block 820, at least on perceived signal strength is received. In block 830, site models are ordered based on the number of received perceived signal strengths. In block 840 a first site model containing the greatest number of received perceived signal strengths from located wireless access points is selected. In block 850, a second site model containing the greatest number of perceived signal strengths from the newly detected wireless access point is selected.

In block 860, the user may be presented with the first and second site models. In block 870, a selection of the first or second site model may be received from the user. In block 880, the newly detected wireless access point may be placed on the selected site model based on the received perceived signal strengths.

We claim:

1. A method comprising:
   receiving at a management computer an indication of a previously unknown wireless access point that is newly detected;
   receiving at the management computer, from at least one previously located wireless access point, a report of signal strengths of the newly detected wireless access point as measured by the at least one previously located wireless access point;
   selecting, from a plurality of site models, a first site model associated with the highest number of received measured signal strengths from located wireless access points included in the report;
   selecting, from the plurality of site models, a second site model associated with the highest number of measured signal strengths from the newly detected wireless access point included in the report;
   causing display of the first and second site models;
   receiving a selection of the first or second site model; and
   responsive to the selection, include the newly detected wireless access point in the confirmed site model.

2. The method of claim 1 further comprising:
   selecting, from the plurality of site models, a third site model associated with a highest count of located wireless access points that had signal strengths included in the report.

3. The method of claim 2,
   wherein each site model of the plurality of site models comprises information about a set of physical location of a respective set of associated located wireless access points, and
   wherein the method further comprises:
   determining that the first site model and the second site model have a same number of received measured signal strengths included in the report; and
   selecting, from the first site model and the second site model, the site model associated with the highest measured signal strength.

4. The method of claim 3, wherein each site model is associated with an exclusive set of located wireless access points, such that a first located wireless access point associated with the first site model would not be included in any of the other of the plurality of site models.

5. The method of claim 1 further comprising: causing display of information about the third site model along with the display of the first and second site models; receiving a selection from the first, second, or third selected site model; and responsive to receiving the confirmation, including the newly detected wireless access point in the selected site model.

6. The method of claim 1 further comprising:
including the newly detected wireless access point in the site model based on the measured signal strengths.

7. The method of claim 1, wherein the report includes a set of measured signal strengths of the at least one previously located wireless access point as measured by the newly detected wireless access point, and
wherein the method further comprises:
selecting a first site model associated with the highest number of received measured signal strengths from located wireless access points included in the report; and
selecting a second site model associated with the highest number of measured signal strengths from the newly detected wireless access point included in the report.

8. The method of claim 1, wherein the report includes a set of measured signal strengths of the newly detected wireless access point as measured by the at least one previously located wireless access point, and
wherein the method further comprises:
selecting the first site model associated with the highest number of received measured signal strengths from located wireless access points included in the report; and
selecting the second site model associated with the highest number of measured signal strengths from the newly detected wireless access point included in the report.

9. A method comprising:
receiving at a management computer an indication of a previously unknown wireless access point that is newly detected;
receiving at the management computer, from the newly detected access point, a report of signal strengths of at least one previously located wireless access point as measured by the newly detected access point; and
selecting from a plurality of site models, a first site model associated with the highest number of received measured signal strengths from located wireless access points included in the report, wherein each site model of the plurality of site models comprises information about a set of physical location of a respective set of associated located wireless access points;
selecting, from the plurality of site models, a second site model associated with the highest number of measured signal strengths from the newly detected wireless access point included in the report;
causing display of the first and second site models;
receiving a selection of the first or second site model; and
responsive to the selection, including the newly detected wireless access point in the selected site model.

10. The method of claim 9 further comprising:
selecting a third site model with a highest count of located wireless access points that had signal strengths included in the report.

11. The method of claim 10,
wherein each site model of the plurality of site models comprises information about a set of physical location of a respective set of associated located wireless access points, and wherein the method further comprises:
determining that the first site model and the second site model have a same number of received measured signal strengths included in the report; and
selecting, from the first site model and the second site model, the site model associated with the highest measured signal strength.

12. The method of claim 9 further comprising:
causing display of information about the third site model along with the display of the first and second site models;
receiving a selection from the first, second, or third site model; and
responsive to receiving the confirmation, including the newly detected wireless access point in the selected site model.

13. The method of claim 9 further comprising:
including the newly detected wireless access point in the site model based on the measured signal strengths.

14. A non-transitory computer readable medium including processor executable instructions thereon, which when executed by the processor causes the processor to:
receive an indication of a previously unknown wireless access point that is newly detected;
receive a report of at least one measured signal strength of the newly detected wireless access point or of at least one previously located wireless access point;
select, from a plurality of site models, a first site model associated with the highest number of received measured signal strengths from located wireless access points included in the report, wherein each site model of the plurality of site models comprises information about a set of physical location of a respective set of associated located wireless access points;
select, from the plurality of site models, a second site model associated with the highest number of measured signal strengths from the newly detected wireless access point included in the report;
cause display of the first and second site models;
receive a selection of the first or second site model; and
responsive to the selection, include the newly detected wireless access point in the selected site model.

15. The medium of claim 14 wherein the at least one measured signal strength is received from the newly detected wireless access point and the measured signal strength comprises a measured signal strength of at least one located wireless access point.

16. The medium of claim 14 wherein the at least one measured signal strength is received from at least one located wireless access point and the measured signal strength comprises a measured signal strength of the newly detected wireless access point.

17. The medium of claim 14 further comprising instructions which, when executed by the processor, cause the processor to:
select a third site model associated with the highest number of received measured signal strengths included in the report.

18. The medium of claim 17, further comprising instructions which, when executed by the processor, cause the processor to:
determine that the first site model and the second site model have a same number of received measured signal strengths included in the report; and
select, from the first site model and the second site model, the site model associated with the highest measured signal strength.

19. The medium of claim 14 wherein the measured signal strengths are received from the newly detected wireless access point and at least one located wireless access point.

20. The medium of claim 19 further comprising instructions which, when executed by the processor, cause the processor to:
include the newly detected wireless access point on the selected site model based on the received measured signal strengths.

* * * * *